(12) United States Patent
O'Donnell et al.

(10) Patent No.: US 11,054,831 B2
(45) Date of Patent: Jul. 6, 2021

(54) AUTOMATIC SITE PLANNING FOR AUTONOMOUS CONSTRUCTION VEHICLES

(71) Applicant: Caterpillar Paving Products Inc., Brooklyn Park, MN (US)

(72) Inventors: Timothy M. O'Donnell, Long Lake, MN (US); Robert J. McGee, Peoria, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 148 days.

(21) Appl. No.: 16/144,456

(22) Filed: Sep. 27, 2018

(65) Prior Publication Data
US 2020/0103906 A1   Apr. 2, 2020

(51) Int. Cl.
*G05D 1/02* (2020.01)

(52) U.S. Cl.
CPC ......... *G05D 1/0214* (2013.01); *G05D 1/0219* (2013.01); *G05D 1/0274* (2013.01); *G05D 2201/0202* (2013.01)

(58) Field of Classification Search
CPC .. G05D 1/0278; G05D 1/0214; G05D 1/0219; G05D 1/0274; G05D 2201/0202
See application file for complete search history.

(56) References Cited

U.S. PATENT DOCUMENTS

| | | | |
|---|---|---|---|
| 6,085,130 A * | 7/2000 | Brandt | G05D 1/0278 701/26 |
| 6,088,644 A | 7/2000 | Brandt et al. | |
| 6,701,239 B2 | 3/2004 | Keefer | |
| 7,491,014 B2 | 2/2009 | Sick | |
| 10,251,329 B2 * | 4/2019 | Foster | A01B 69/00 |
| 2008/0063473 A1 * | 3/2008 | Congdon | E01C 19/288 404/75 |
| 2015/0167257 A1 | 6/2015 | Korb et al. | |
| 2019/0186094 A1 * | 6/2019 | Marsolek | E02D 3/046 |

* cited by examiner

*Primary Examiner* — Rachid Bendidi

(57) ABSTRACT

A method for controlling an autonomous construction vehicle may include defining a boundary of a construction site and automatically creating a site plan for navigating the autonomous construction vehicle within the boundary. The site plan includes a work area within the boundary, a maneuver area positioned between the work area and the boundary, a start point for the autonomous construction vehicle, and a path for the autonomous construction vehicle. A controller can then provide the site plan for review and activate autonomy mode to automatically control the autonomous construction vehicle according to the site plan.

19 Claims, 4 Drawing Sheets

AUTOMATIC SITE PLANNING FOR AUTONOMOUS CONSTRUCTION VEHICLES

TECHNICAL FIELD

The present disclosure generally relates to the field of construction. More particularly, the present disclosure relates to systems and methods of automatic construction site planning for autonomous construction vehicles.

BACKGROUND

Autonomous worksites can employ a plurality of autonomous machines to perform a variety of tasks that may be controlled by a combination of on-board and off-board computers, processors, and other electronic controllers rather than human operators. As a result, autonomous operation may enhance the productivity of the machines, and reduce the human resources required for controlling the operation of the worksite. Construction site planning for autonomous construction vehicles involves determining the path a construction vehicle will take. Various conventional attempts at construction site planning may not be automatic, may be less efficient, may limit the function of the construction vehicle, may be susceptible to user error, etc.

SUMMARY OF THE INVENTION

To summarize at least a portion of the disclosure, a non-limiting list of examples is provided here:

In one aspect, the present disclosure relates to a method for controlling an autonomous construction vehicle. The method includes recording a boundary of a construction site. The method further includes defining a path orientation for the autonomous construction vehicle. The method also includes defining a maneuver area for the autonomous construction vehicle based on the boundary and specifications of the autonomous construction vehicle. The method further includes defining a path for the autonomous construction vehicle to navigate the construction site, with the path orientated according to the path orientation. The method also includes automatically creating a site plan indicating the boundary, path, start point, and maneuver area. The method further includes controlling the operation of the autonomous construction vehicle based on the site plan.

In another aspect, the present disclosure relates to a method for controlling an autonomous construction vehicle. The method includes recording a boundary of a construction site. The method further includes automatically creating a site plan for navigating the autonomous construction vehicle within the boundary, the site plan including a work area within the boundary, a maneuver area positioned between the work area and the boundary, a start point for the autonomous construction vehicle, and a path for the autonomous construction vehicle. The method also includes providing the site plan for review. The method further includes activating autonomy mode to automatically control the autonomous construction vehicle according to the site plan.

In another aspect, the present disclosure relates to a system including an autonomous construction vehicle that includes a controller. The controller is configured to record a boundary of a construction site, define a path orientation for the autonomous construction vehicle, define a start point for the autonomous construction vehicle, define a maneuver area for the autonomous construction vehicle based on the boundary and specifications of the autonomous construction vehicle, define a path for the autonomous construction vehicle to navigate the construction site, the path being orientated according to the path orientation, automatically create a site plan indicating the boundary, path, start point, and maneuver area, and automatically control the operation of the autonomous construction vehicle based on the site plan.

These and other examples and features of the present devices, systems, and methods will be set forth in part in the following Detailed Description. This overview is intended to provide a summary of subject matter of the present patent application. It is not intended to provide an exclusive or exhaustive removal of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present disclosure provides systems and methods for automatic construction site planning for autonomous construction vehicles and autonomous control of the autonomous construction vehicle based on the site plan.

For the purposes of this disclosure, "autonomous" means both "autonomous and "semi-autonomous" such that autonomous construction vehicles may include fully autonomous construction vehicles or semi-autonomous construction vehicles which are controlled by a predetermined construction site plan designating the path that the construction vehicle is to take within a worksite boundary. In some examples, "autonomous" may include vehicles with an operator in the vehicles for a maimed operation. In at least one example, "about" and "approximately" may mean within 10% of a stated value. In at least one example, "about" and "approximately" may mean within 1% of a stated value. For the purposes of this disclosure positional terms such as "front," "rear," "side," "right," "left," etc. are for ease of description and are relative to one another or other elements.

Figure 1:
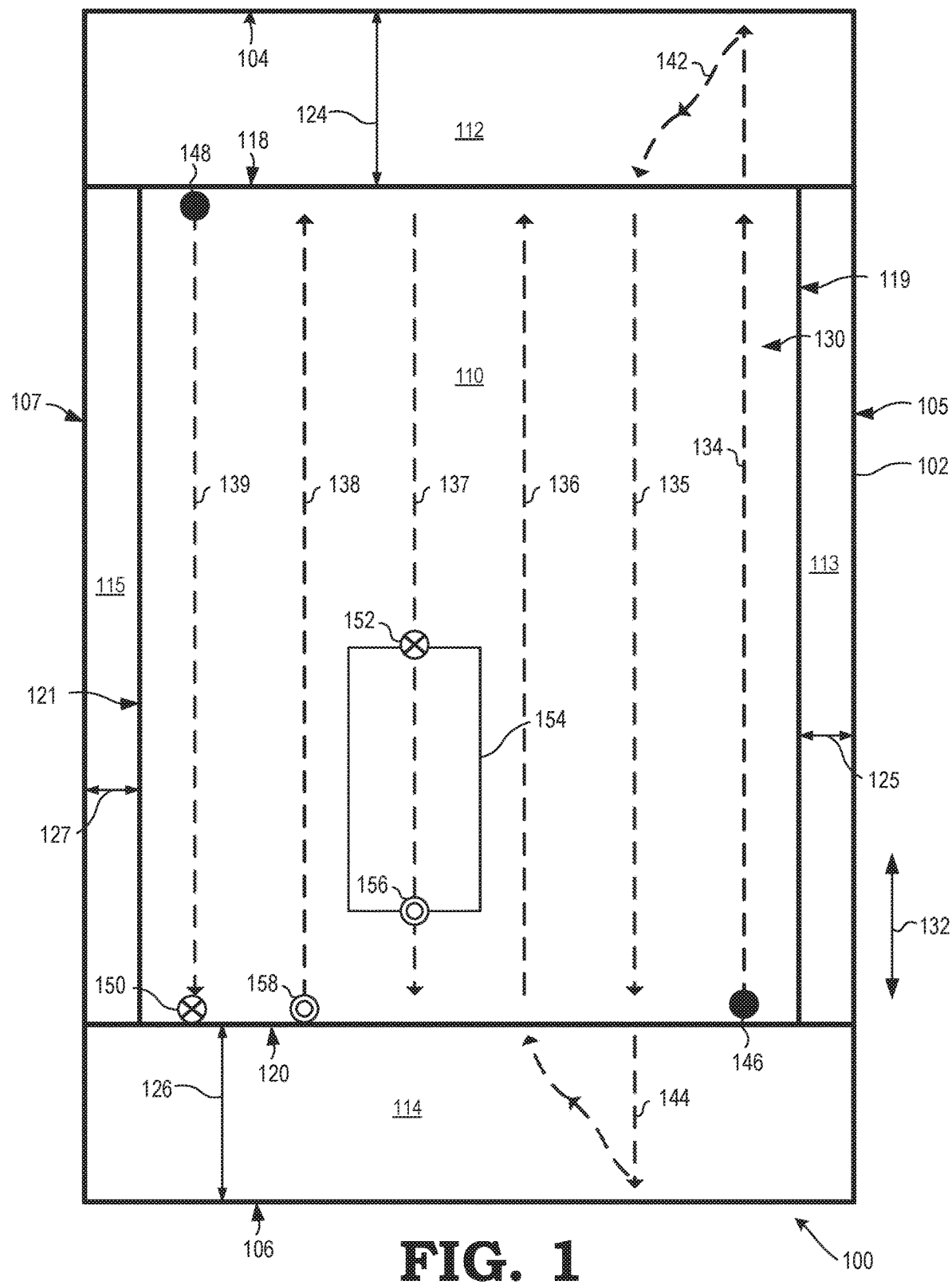
FIG. 1 is a plan view of a construction site plan for an autonomous construction vehicle, in accordance with at least one example.

FIG. 1 is a plan view of a construction site plan 100 for an autonomous construction vehicle, in accordance with at least one example. The site plan 100 includes a boundary 102 defined by front boundary edge 104, right side boundary edge 105, rear boundary edge 106, and left side boundary edge 107. The boundary 102 indicates the area in which the autonomous construction vehicle is permitted to travel.

The site plan 100 further includes a work area 110, a front maneuver area 112, a right side maneuver area 113, a rear maneuver area 114, and a left side maneuver area 115. The maneuver areas 112-115 are positioned between the work area 110 and the boundary 102. The work area 110 is defined by a front work area edge 118, a right side work area edge 119, a rear work area edge 120, and a left side work area edge 121. The maneuver areas 112-115 represent offset distances 124, 125, 126, 127 from the boundary 102 to accommodate errors, transitional movement of the autonomous construction vehicle, specifications of the autonomous construction vehicle, or the like. In some examples, the offset distances 124-127 of the maneuver areas 112-114 may be based on a minimum distance for a particular job to be completed and autonomous construction vehicle being used. In the illustrated example, the front and rear maneuver areas 112, 114, each include an offset distance 124, 126 large enough to accommodate the autonomous construction vehicle to change positions (the front and rear offset distances 124, 126 may or may not be the same depending on the autonomous construction vehicle being used). In at least one example, such an offset distance minimum would be selected from the range of about 10 meters to about 20 meters. In at least one example, such a minimum offset distance is about 15 meters. In the illustrated example, the side maneuver areas 113, 115 each include offset distances 125, 127 to accommodate a margin of error, for example a GPS (Global Positioning System) error. Such a minimum offset distance may be selected from the range of about 0.5 meters to about 2 meters. In a least one example such a minimum offset distance is about 1 meter.

The site plan 100 further includes a path 130 having a path based on a path orientation 132 (the site plan 100 shows the path orientation 132 for description purposes, but in other examples, the path orientation 132 may be indicated directly in the path 130 or otherwise). The path 130 may include a plurality of path portions 134-139 indicating the path the autonomous construction vehicle is to use to traverse the work area 110. In some examples, the path 130 may also include maneuver paths, such as representative maneuver paths 142, 144. In the illustrated example, each path portion 134-139 indicates a direction of movement of the autonomous construction vehicle. In this example, the path 130 indicates that the autonomous construction vehicle is to move toward the front work area, edge 118 along path portion 134, then move toward the rear work area edge 120 along path portion 135, then toward the front area work edge 118 along path 136, and so on. In the illustrated example, the autonomous construction vehicle is to operate in forward and in reverse, such that if it is in forward while traversing path portion 134, then it will be in reverse traversing path 135, and in forward again traversing path 136. Due to this, the autonomous construction vehicle requires the front maneuver portion 112 to move from path portion 134 to path portion 135 and requires the rear maneuver portion 141 to move from path portion 135 to path portion 136. In the illustrated example, these movements are indicated by maneuver paths 142, 144. While maneuver paths 142, 144 are only shown between portions 134, 135, and 136, such movements would be required between all paths.

In the illustrated example, the maneuver paths 142, 144 show the autonomous construction vehicle continuing in the direction of the respective path portion 134, 135 beyond the respective work area edge 118, 120 and then changing directions and steering toward the subsequent path portion 135, 136. For example, if the autonomous construction vehicle traverses path portion 135 in reverse, it will continue in reverse beyond the front work area edge 118 then switch to forward and steer toward path portion 135, traverse path 135 in forward and continue in forward beyond rear work area edge 120 then shift to reverse and steer toward path 136.

The illustrated site plan 100 indicates two possible start points 146, 148, however other examples may indicate any number of possible start points suitable for the construction site. In at least one example, a single start point 146 is provided, but other optional start points 148 may be presented when prompted. The start points 146, 148 may be determined based on the paths 130, the path orientation 132, the location of the autonomous construction vehicle, the heading of the autonomous construction vehicle, one or more obstacles at the worksite, or the like. The start point 146 indicates where in the work area. 110 the autonomous construction vehicle will begin traversing the path 130 to perform the work in the work area 110. In at least one example, the autonomous construction vehicle will automatically traverse the path 130 of the site plan 100 until it reaches one or more stop points 150, 152. Stop points 150, 152 may be automatically predefined, may be manually predefined, or may be manually or automatically defined in real time. For example, if autonomous control is to be stopped after completion of the work area, then stop point 150 may be automatically predefined based on start point 146, since the autonomous construction vehicle will have traversed the enter work area 110 via the path 130 by stop point 150. In other examples, an obstacle or other circumstance 154 may cause a stop point 152 to be predefined or defined in real time. For example, if a user wants to make adjustments, avoid an obstacle, take a break, traverse a section manually, etc. the user may provide manual input to stop autonomous mode at stop point 152.

When the user is ready to resume autonomous mode, a resume manual input may be provided, and the site plan 100 may indicate one or more potential restart points 156, 158. In at least one example, the restart points 156, 158 may be manually adjusted or set. In the illustrated example, the restart points 156, 158 take into account the path portions 134, 135, 136 that have already been traversed. In at least one example, the site plan provides a restart point option at the stop point 152, such that the autonomous construction vehicle may resume where it left off. In another example, the restart point 156 may be automatically or manually designated based on the obstacle or other circumstance 154. For example, if there is an obstacle 154 in the work area, the stop point 152 and restart point 156 may be predefined or indicated in real time, and the autonomous construction vehicle may maneuver around the obstacle 154 without interfering with the other path portions 138, 139 (e.g., for a compactor, the drums would be turned off such that it is not compacting during the maneuver), and resume work at the restart point 156. In one example, a user may provide a user input to indicate stop point 152 so that the user can manually operate the autonomous construction vehicle over a selection 154 of the path portion 137, and then the user may provide a user input to indicate start point 156, so that there is no gap in the work performed on the path portion 137. In some examples, the site plan 100 may indicate a start point 158 at the beginning of the next path portion 138.

Figure 2:
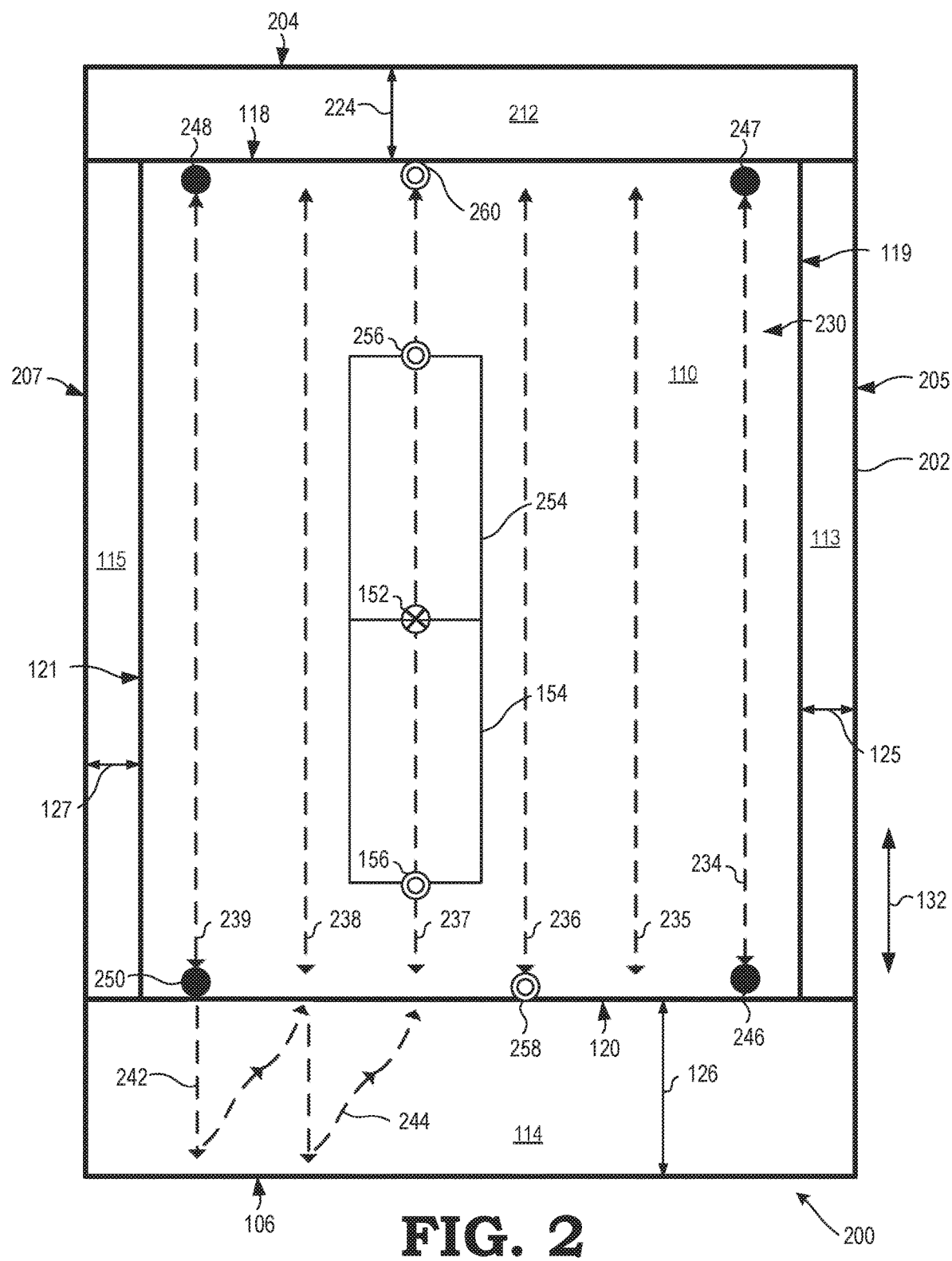
FIG. 2 is a plan view of a construction site plan for an autonomous construction vehicle, in accordance with at least one example.

FIG. 2 is a plan view of a construction site plan 200 for an autonomous construction vehicle, in accordance with at least one example. Many of the elements of the constructions site plan 200 are consistent with the elements described with reference to construction site plan 100 of FIG. 1, and as such share the same reference numerals. Site plan 200 defines a boundary 202 (defined by boundary edges 204, 205, 106, 207) and a front maneuver area 212 that differs from site plan 100. This is because site plan 200 includes a path 230 (having path portions 234-239) in which the autonomous construction vehicle makes two passes of each path portion 234-239. That is, in the illustrated example, the autonomous construction vehicle drives forward up path portion 239 toward front work area edge 118, then reverses down the same path portion 239 toward rear work area edge 120 before advancing to the next path portion 238 via maneuver path 242, it will also make two passes on path portion 238 before advancing to the next path portion 237 via maneuver path 244. Alternatively, the autonomous construction vehicle could reverse up path portion 239 toward front work area edge 188, then drive forward down the same path portion 239 toward rear work area edge 120 before advancing to the next path portion 238. Due to this configuration, the front maneuver area 212 does not need to accommodate a maneuver path (e.g., maneuver path 142 of FIG. 1), since the autonomous construction vehicle only changes path portions 234-239 in the rear maneuver area 114. Since the front maneuver area 212 does not need to be large enough to accommodate the autonomous construction vehicle moving from one path portion to another, it may have a smaller minimum offset distance 224. In some examples, the minimum offset distance 224 in such a situation is selected from the range of about 5 meters to about 15 meters. In at least one example, the minimum offset distance 224 is about 10 meters.

Since the site plan 200 includes a double pass of each path portion 134-139, the site plan also includes a plurality of potential start and stop points 246, 247, 248, 250. For example, the autonomous construction vehicle could start at start point 250, do a double pass of path portion 239, proceed to do a double pass of path portion 238, and onward until the autonomous construction vehicle completes its second pass of path portion 234 and completes the path 230 at stop point 246. Similarly, if the autonomous construction vehicle started at start point 246, it would end at stop point 250; if it started at start point 248, it would end at stop point 247; and if it started al start point 247, it would end at stop point 248.

Figure 3:
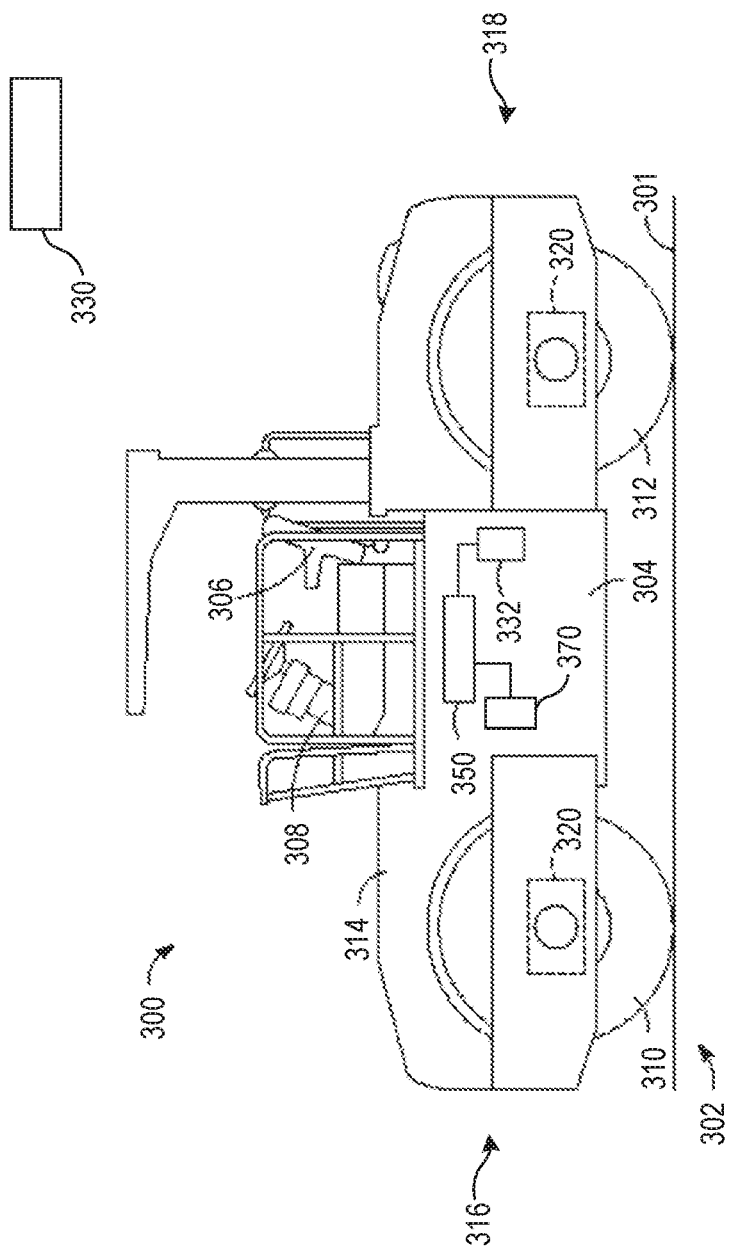
FIG. 3 depicts an autonomous construction vehicle, in accordance with at least one example of the present disclosure.

As discussed with reference to site plan 100, the site plan 200 may include a stop point 152 within the work area 110 before completion of the site plan 200. If the obstacle or other circumstance 154 is on the second pass of the path portion 237, then the resume options are similar to those discussed with reference to site plan 100, and autonomy mode may continue after the obstacle or other circumstance 154 at restart point 156 or at the start of the subsequent path portion 236 at restart point 258. If the obstacle or other circumstance 254 occurs on the first pass only of the path portion 237, then autonomy mode may be resumed after the obstacle 254 at restart point 256 (heading toward front work area edge 118) or at the start of the second pass of section 237 at restart point 260. In some examples, the obstacle or other circumstance 154 may affect both passes, such that on each side of the obstacle or other circumstance 154 is a stop/restart point 152, 156. In such cases, autonomy mode would stop at stop/restart point 156 and resume at stop/restart point 152 on the first pass and stop at stop/restart point 152 and resume at stop/restart point 156 on the second pass (assuming a start point 250 and a stop point 246 for the path 230), FIG. 3 depicts a system for controlling an autonomous construction vehicle 300, in accordance with at least one example of the present disclosure. Autonomous construction vehicles may include any vehicle used on a constructions site that could benefit from autonomous control. Autonomous construction vehicles may include, for example, cold planers, paving machines, graders, compaction machines, tractors, or the like. To rehabilitate roadways for continued vehicular use, spent asphalt is removed in preparation for resurfacing using a cold planer, sometimes also called road mills or scarifiers, to break up and remove layers of an asphalt roadway. A cold planer typically includes a milling drum, fitted with cutting tools, that is rotated to break up the surface of the roadway.

Paving machines are commonly used to apply and spread a mat of asphalt material relatively evenly over a work surface. These machines are generally used in the construction of roads and parking lots. A paving machine generally includes a hopper for receiving asphalt material, a conveyor system for transferring the asphalt from the hopper for discharge onto a roadbed, and a set of augers to evenly spread the paving material in front of a screed plate. The screed plate smooths the asphalt material, ideally leaving behind a mat of uniform depth, density, texture and smoothness.

Compaction machines are frequently employed for compacting fresh laid asphalt, dirt, gravel, and other compactable work materials associated with road surfaces. For example, during construction of roadways, highways, parking lots and the like, the loose asphalt that is deposited by the paving machines is compacted by one or more compactors traveling over the surface, whereby the weight of the compactor compresses the asphalt to a solidified mass.

In the illustrated example, the autonomous construction vehicle 300 is a compactor that can travel over a surface 301 compacting a work material 302, for example, an asphalt mat. Other types of compactors are contemplated to implement the disclosed process and device including soil compactors, asphalt compactors and vibratory compactors, for example. The compactor machine 300 includes a body or frame 304 that inter-operatively connects the various physical and structural features that enable the compactor machine 300 to function. These features may include an operator cab 306 that is mounted on top of the frame 304, from which an operator may control and direct operation of the compactor machine 300. Additionally, a steering apparatus 308 and similar controls may be located within the operator cab 306. To propel the compactor machine 300 over the surface 301, an engine 314, such as an internal combustion engine, can also be mounted to the frame 304 and can generate power to physically move the compactor machine 300.

To enable motion of the compactor machine 300 relative to the surface 301, the illustrated compactor machine 300 includes a first roller drum 310 (or compacting element 310) and a second roller drum 312 (or compacting element 312) that are in rolling contact with the surface 301. Both the first roller drum 310 and the second roller drum 312 are rotatably coupled to the frame 304 so that the first and second roller drums 310, 312 roll over the surface 301 as the compaction machine 300 travels thereon. To transfer motive power from the power system to the surface 301, the power system can operatively engage and rotate the first roller drum 310, the second roller drum 312, or combinations thereof, through an appropriate power train (not shown).

It will be appreciated that the first roller drum 310 can have the same or different construction as the second roller drum 312. It should further be appreciated that the machine 300 may include a single roller drum and tires (not shown)

to contact the surface 301. Both the first roller drum 310 and the second roller drum 312 may have a vibratory mechanism 320. While FIG. 3 shows both the first and second roller drums 310, 312 having a vibratory mechanism 320, in other embodiments there may be a single vibratory mechanism 320 located on either the first or the second roller drum 310, 312.

The compactor 300 includes a front 316 and a rear 318. The position of the front 316 relative to the rear 318 indicates a heading of the compactor 300. In some examples, the front 316 of the compactor is used for the heading, while in other examples the rear 318 of the compactor 300 is used for the heading, depending on the operation of the compactor 300 and the way the heading is being used. In either case, an orientation of an axis of the compactor 300 extending between the front 316 and the rear 318 indicates the heading of the compactor 300.

Compactor 300 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the machine 300 and that may cooperate to sense various functions, operations, and operating characteristics of the machine and/or aspects of the environment in which the machine is operating.

The overall operation of the construction vehicle 300 within a worksite may be managed by a vehicle controller 350 on the construction vehicle 300 or an external controller 330 that is at least partially in communication with the construction vehicle 300. Moreover, each construction vehicle 300 may include any one or more of a variety of feedback devices capable of signaling, tracking, monitoring, or otherwise communicating relevant machine information to the base station. For example, each machine 300 may include a locating device 332 configured to communicate with the external controller 330 via any of a variety of technology communication mechanisms to communicate various information pertaining to the position and/or orientation of the machine 300 relative to the construction site.

The vehicle controller 350 may receive input signals (manual inputs) from an operator operating the construction vehicle 300 from within cab 306 (e.g. via a user interface, display, controls, or the like) or off-board through a wireless communications system, e.g. external controller 330. The vehicle controller 350 or the external controller 330 may control the operation of various aspects of the construction vehicle 300 including, for example, the drivetrain and the hydraulic systems. In at least one example, only a vehicle controller 350 is configured to control the autonomous operation of the compactor 300.

The vehicle controller 350 may be an electronic controller that performs operations, executes control algorithms, stores and retrieves data and other desired operations. The vehicle controller 350 may include, or access, memory, secondary storage devices, processors, and any other components for running an application. The memory and secondary storage devices may be in the form of read-only memory (ROM) or random-access memory (RAM) or integrated circuitry that is accessible by the controller. Various other circuits may be associated with the vehicle controller 350 such as power supply circuitry, signal conditioning circuitry, driver circuitry, and other types of circuitry.

The vehicle controller 350 may be a single controller or may include more than one controller disposed to control various functions and/or features of the construction vehicle 300. The term "controller" is meant to be used in its broadest sense to include one or more controllers and/or microprocessors that may cooperate in controlling various functions and operations of the construction vehicle 300. The term "controller" does not include a human. The functionality of the controller 350 may be implemented in hardware and/or software without regard to the functionality. The controller 350 may rely on one or more data maps relating to the operating conditions and the operating environment of the machine 300 and a construction site that may be stored in memory. Each of these data maps may include a collection of data in the form of tables, graphs, digital images and/or equations.

External controller 330 may include or access memory, secondary storage devices, processors, and any other components for running an application. Control of the construction vehicle 300 may be implemented in any number of different arrangements. For example, control may be at least partially implemented at external controller 330 situated locally and/or remotely relative to the construction site with sufficient means for communicating with the construction vehicle 300, via any of a variety of wireless communication systems, for example via a satellite, or the like. Using any of the foregoing arrangements, external controller 330 may generally be configured to monitor the position of the compactor 300 relative to the construction site and a predetermined target compaction operation and provide instructions for controlling the compactor 300 in an efficient manner to compact surface 301. In at least one example, the external controller 330 may wirelessly communicate a construction site plan to the vehicle controller 350.

Construction vehicle 300 may be configured to be operated autonomously, semi-autonomously, or manually. When operating semi-autonomously or manually, the construction vehicle 300 may be operated by remote control and/or by an operator physically located within the cab 306.

Construction vehicle 300 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the construction vehicle 300 and that may cooperate to sense various functions, operations, and operating characteristics of the machine and/or aspects of the environment in which the machine is operating.

The vehicle controller 350 may include a sensing system 370 configured to sense the position and orientation (i.e., the heading, pitch, roll or tilt, and yaw) of the machine relative to the construction site. The sensing system 370 may include a plurality of individual sensors that cooperate to generate and provide position signals to the vehicle controller 350 indicative of the position and orientation of the construction vehicle 300. In one example, the position sensor 370 may include one or more sensors that interact with a positioning system such as a global navigation satellite system or a global positioning system to operate as a position sensor. In another example, the position sensor 370 may further include a slope or inclination sensor such as pitch angle sensor for measuring the slope or inclination of the construction vehicle 300 relative to a reference, for example a ground or earth reference.

The vehicle controller 350 may use position signals from the position sensors 370 to determine the position of the construction vehicle 300 within a construction site. In other examples, the position sensor 370 may include a perception-based system, or may use other systems such as lasers, sonar, or radar to determine all or some aspects of the position and orientation of the construction vehicle 300. The position sensing system 370 may also be used to determine a ground speed of the construction vehicle 300. Other sensors or a dedicated ground speed sensor may alternatively be used to determine the ground speed of the construction vehicle 300. Sensors may also be provided to monitor the operating conditions of the machine engine and drivetrain such as an engine speed sensor. Other sensors necessary or desirable for operating the construction vehicle 300 may be provided.

While the construction vehicle 300 is illustrated as a compactor machine, one of ordinary skill in the art would understand that the systems and methods of the present application extend to other construction vehicles.

Figure 4:
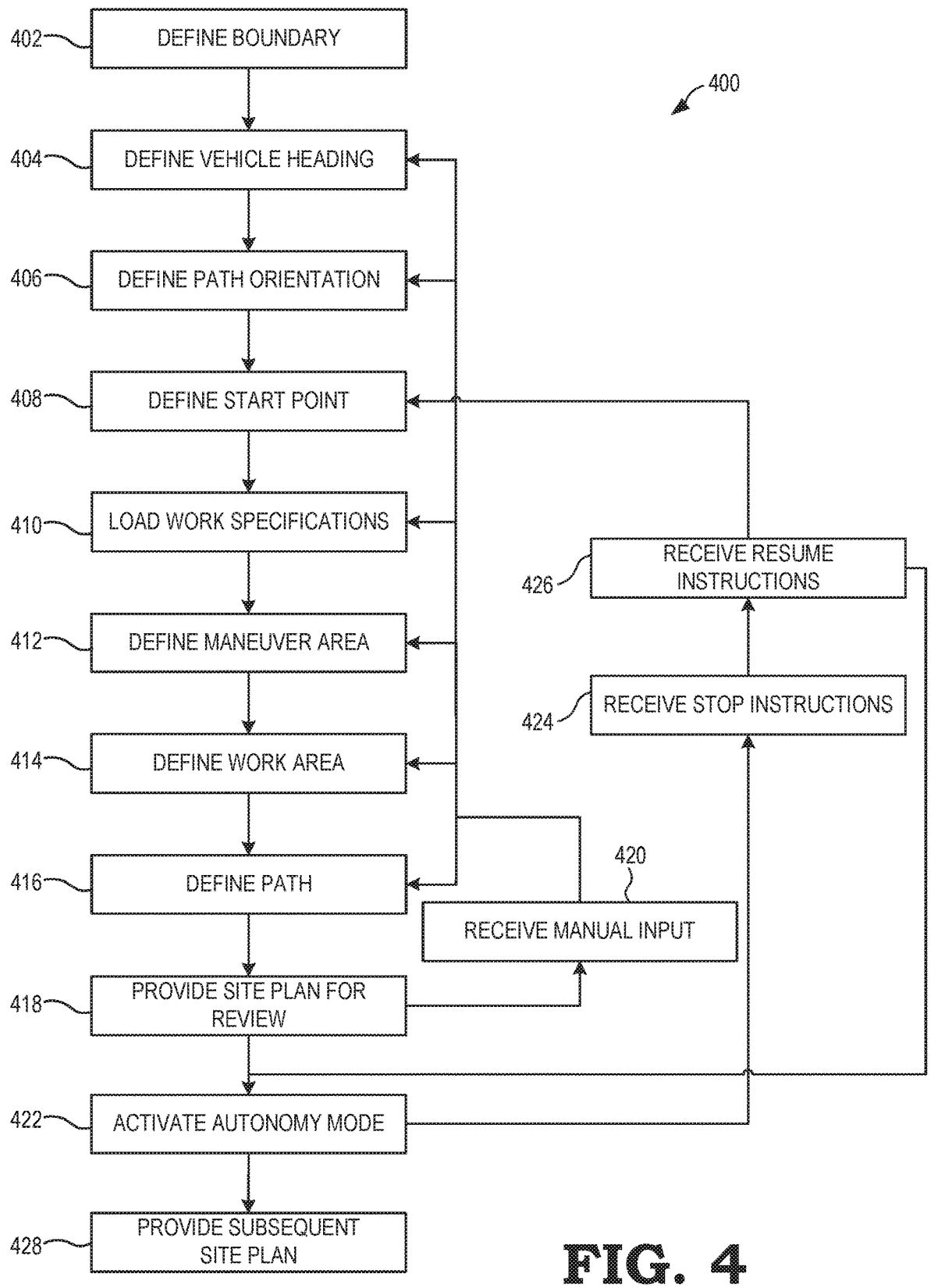
FIG. 4 is flow chart of a method for controlling an autonomous construction vehicle, in accordance with at least one example.

FIG. 4 is flow chart of a method 400 for controlling an autonomous construction vehicle, such as the compactor 300 of FIG. 3. For ease of description, the method 400 is described with reference to elements found in FIGS. 1-3. However, it should not be considered an exhaustive list of representative elements, such that FIGS. 1-3 may include additional applicable elements that were omitted for simplicity rather than due to a lack of relevancy.

At block 402, the controller 350 defines a boundary 102, 202. In at least one example, the user enables boundary recording through via manual input before recording the outer boundary. After recording has been enabled; the operator may manually drive the outer boundary 102, 202 and the controller 350 monitors the 3D coordinates/position of the autonomous construction vehicle 300 and records the outer edges of the autonomous construction vehicle 300 as the boundary 102, 202. In at least one example, the user interface of the autonomous construction vehicle 300 gives the operator visual feedback during the recording process of the relative position of the machine and the recorded boundary 102, 202. The operator generally has the ability to pause, cancel, and resume the recording process. In at least one example, the operator may also record a boundary around one or more boundaries or other circumstances requiring special treatment 154, 254. After the boundary 102, 202 has been driven and recorded; the operator may stop recording through user interface of the autonomous construction vehicle 300. In some examples, there is a minimum length requirement for the boundary 102, 202. For example, at least one boundary edge 104, 105, 106, 107, 204, 205, 207 must be longer than the minimum distance requirement. If the work area 110 is too small or the minimum boundary edge length is not met, and the operator stops boundary recording; the controller 350 may display an error message and ask the operator to record additional boundary length. In at least one example, the minimum boundary edge length is selected based on the dimensions or other specifications of the autonomous control vehicle 300. In at least one example, the minimum boundary edge length is selected from the range of between about 30 meters and about 50 meters. In at least one example the minimum boundary edge length is about 40 meters. In at least one example, the controller 350 provides the resulting boundary 102, 202 for review by the operator, for example via a user interface in the operator cab 306. In at least one example, boundary information is downloaded or otherwise received or retrieved from an external source (for example, another machine, an external controller, a database, etc.) to define the boundary.

At block 404, the controller 350 defines a vehicle heading. The vehicle heading may be determined automatically based on the current orientation of the autonomous construction vehicle 300 or manually based on a user input by the operator. In some examples, the controller 350 may use the front 316 of the autonomous construction vehicle 300 to determine the heading. In other examples, where the autonomous construction vehicle can equally be used in reverse, the rear 318 may be considered for the heading. Generally, the heading includes an orientation of the autonomous construction vehicle 300, including how the front 316 is positioned relative to the rear 318. In at least one example, a forward or drive vehicle heading is used when the front 316 of the autonomous control vehicle 300 is facing the boundary 102, 202, and a backward or reverse vehicle heading is used when the rear 318 of the autonomous control vehicle 300 is facing the boundary 102, 202.

At block 406, the controller 350 defines a path orientation 132, which may be determined automatically based on the shape of the boundary 102, 202, determined automatically based on vehicle heading, or determined based on manual input. In at least one example, the path orientation 132 is determined such that the maximum length of the boundary 102, 202 is used. This can help minimize the amount of maneuvering area required, maximize the work area 110, and allow for a more efficient job. In some examples, the controller 350 may automatically align the path orientation 132 with the vehicle heading, such that the autonomous construction vehicle 300 may continue in its current orientation along the path orientation. In some examples, the user may manually provide a path orientation 132. In at least one example, the path orientation 132 may be provided to the operator for confirmation or editing.

At block 408, the controller 350 defines a start point 146, 148, 246, 247, 248, 250. In the example of a rectangular boundary 102, 202, there are often four possible start points (the four corners). The controller 350 may choose the start point 146, 148, 246, 247, 248, 250 automatically or may provide optional start points for the operator to select from manually. In at least one example, the controller 350 chooses the start point based on the current position of the autonomous control vehicle 300. In at least one example, the controller 350 uses the closest lane of the two longest edges 105, 107, 205, 207 of the boundary 102, 202, and chooses the start point to be the end of that edge that is closest to the current position of the autonomous control vehicle 300.

At block 410, the controller 350 loads work specifications. In the example of a compactor, the work specifications may include method spec compaction, which refers to a process of compaction that is determined by a specification. For example, an engineering firm or government agency may perform an engineering study and then write a detailed specification that the contractor must follow to meet the requirements for the work site. Another possibility is that the contractor is given a non-method spec (e.g. density requirement) and then is left to define the appropriate method of achieving that spec on their own (e.g. via compaction). In this case, the contractor may define an internal method spec that is to be used for the entire job. The compaction specification may then be given to the operator and the operator must follow the orders included in the specification. For example, in the case of a compaction job, the specification may include machine dimensions, areas to compact, number of passes, vibration amplitude, maximum compaction propel speed, vibration frequency, a combination of these, or the like.

In some examples, the controller 350 loads the most recent work specifications from the most recently used work site. If no previous settings exist, then the controller 350 may load default work specifications. In the case of a compactor 300, the work specifications, whether manually entered, accessed from previous work sites, accessed from defaults, or otherwise loaded may include: number of high amplitude passes, number of low amplitude passes, number of static passes (vibratory system off), total number of passes, vehicle speed, impacts per distance, lane overlap, estimated completion time, a combination of these, or the like.

In an example of a compactor 300, there may be two sets of default values the operator may pick from: one set is for "cohesive" materials and the other is for "granular" materials. In some examples, the operator may be able to pick from those default compaction specification or select a custom compaction specification. The operator may also have the ability to modify the compaction specifications after the initial setup, before autonomy mode, during autonomy mode, after autonomy mode, a combination of these, or the like. In some examples, each value that must be selected by the operator will have a default/recommended value. In some examples, the operator has the ability to easily and quickly adjust the default value.

At block 412, the controller 350 defines a maneuver area 112-115. Since the autonomous construction vehicle 300 is not allowed to leave the boundary 102, 202, maneuver areas provide an area for the autonomous construction vehicle 300 to maneuver and shift from one lane (or path portion) another without interfering with the work area 110 and without leaving the boundary 102, 202. The front and rear maneuver area 112, 114, 212 size may change depending on the number of passes required and the lane (path portion) shift location. In the case of compaction with a compactor 300, if the specification includes an even number of passes all of the lane shifts can be achieved in the rear maneuver area 114. For compaction specifications with an odd number of passes lane shifts are required in the rear maneuver 114 area and the front maneuver area 112. The minimum maneuver distances are determined by the vehicle capabilities. For example, in the case of a compactor 300, these may include: steering speed, angle, vibe on time, vibe off time, propel acceleration and deceleration rate.

In the example of the compactor 300, steering in the work area 110 must be limited to the minimum steering commands to maintain the current compaction lane (path portion). Shifting from one compaction lane to the next lane is prohibited in the work area 110. Shifting lanes must be completed in the maneuver areas 112, 114 in order to reduce the risk of the drum 310, 312 or tires marring the compaction material. This is especially true toward the end of the compaction process when the material becomes "sealed." When both the drum and tires 310, 312 exit the work area 110 the lane shift maneuver can begin along the maneuver path 142, 144, 242, 244. Vibe changes in the work area 110 must also be limited. Vibe system on/off and amplitude changes may be done in the maneuver areas 112, 114. Vibe frequency and machine speed adjustment may be allowed in the work area 110. The vibe system requires some time to speed up to the frequency set point and to slow down when commanded off, and amplitude changes require the vibration system to reverse direction which takes time to slow down to zero and ramp up vibration speed in the opposite direction. In some examples, when transitioning from the work area 110 to the maneuver area 112, 114, the vibe system remains constant until the drum 310, 312 has passed completely into the maneuver area 112, 114. Once the drum 310, 312 is in the maneuver area 112, 114, the amplitude may be changed, or the on/off command may be changed. When transitioning from the maneuver area 112, 114 to the work area 110, the vibe system remains constant before the drum 310, 312 reaches the work area 110.

Vibe on is allowed in the maneuver area 112, 114, however vibe on is not allowed when the machine is stationary. In both the maneuver area 112, 114 and the work area 110 the machine must be propelling when the vibe system is on. In at least one example, the minimum vehicle speed with vibe on is 0.6 Kph. This requirement is to help prevent leaving a divot in the material due to excessive vibe over one location. For this reason, when a direction shift is required (lane and vibe remain constant), the drum 310, 312 of the compactor 300 must leave the work area 110 before the ground speed of the compactor 300 reaches zero.

In some examples, steering while stationary is not allowed in any area. In at least one example, the minimum propel speed (forward or reverse) while steering is 0.5 Kph. This requirement is to help prevent leaving a marred surface behind with the autonomy system. Additionally, in some examples there is a relationship between propel speed and allowed steering velocity. For example, at low propel speeds steering rate is limited, and at higher propel speeds full steering velocity is permitted. In at least one example, a propel speed of 0.5 Kph a max steering velocity of about 30 mm/sec (millimeters per second) is permitted; at a propel speed of 1 Kph a max steering velocity of about 80 mm/sec is permitted; at a propel speed of 2 Kph a maximum steering velocity of about 120 mm/sec is permitted; and for a propel speed of 3+ Kph there is no limit on the steering velocity. In at least one example, there may be a steering angle limit in the work area 110.

At block 414, the controller 350 defines a work area 110. In at least one example the work area 110 is defined based on applying minimum offset distances 124-127, 224 to the boundary 102, 202. In at least one example, the work area 110 may be predefined from the work specification or from manual input.

At block 416, the controller 350 defines a path 130, 230. The path 130, 230 may include a plurality of path portions 134-139, 234-239 (or lanes) corresponding to the work specifications including the specifications of the autonomous construction vehicle 300. As described above, the path portions 134-139, 234-239 align with the defined path orientation 132 such that the path 130, 230 indicates the manner in which the autonomous construction vehicle 300 will automatically traverse the work area 110 from the defined start point to the end point. In at least one example, the path 130, 230 includes maneuver paths 142, 144, 242, 244 indicating the manner in which the autonomous construction vehicle 300 will automatically move from one path portion to the next (change lanes).

At block 418, the controller 350 provides the site plan 100, 200 for review, for example, by the user. For purposes of this disclosure the user may be in the autonomous construction vehicle 300 or remote relative to the autonomous construction vehicle 300. In some examples user is used interchangeably with operator.

At block 420, the controller 350 optionally receives manual input from the user. For example, the user may indicate one or more changes to the site plan 100, 200 that may cause the controller 350 to return to any of blocks 404-416 to update the site plan 100, 200.

If the operator does not have any changes to make to the site plan 100, 200, at block 422, the controller 350 activates autonomy mode and begins controlling the movement of the autonomous construction vehicle 300 based on the site plan 100, 200. In at least one example, the operator must first move the autonomous construction vehicle 300 within the boundary 102, 202 before autonomy mode will activate. In at least one example, the controller 350 may provide instructions for the operator.

At block 424, the controller 350 receives stop instructions indicating that autonomy mode is to cease. The stop instructions may be a manual input. In some examples, the stop instructions may be automatic from the site plan 100, 200 with a predefined stop point 148, 150, 152, 156, 246, 247, 248, 250. The operator may stop or start autonomy mode due to an obstacle or other circumstance 154, 254, for example: operator work breaks, fuel fills, objects in the patch 130, 230, material rework, material testing, manual control, incorrect base material, puddle in the work area 110, a combination of these, or the like. In at least one example, when autonomy mode is stopped, the controller 350 saves the status of the autonomous control vehicle 300, so that the path 130, 230 may be resumed when autonomy mode is resumed. In at least one example, the controller 350 may save boundary information, work area information, path information, vehicle heading information, maneuver area information, number of passes completed, last point completed, next point to complete. If the operator manually compacts in the 110 the controller 350 may track the manual compaction process and update the site plan 100, 200 accordingly. Alternatively, the operator may modify and re-plan the work site to generate a new site plan.

At block 426, the controller 350 receives resume instructions indicating that autonomy mode is to resume. In some examples, these may be manual instructions. In other examples, one or more parameters may be set, for example a timer or a location that indicates autonomy mode is to resume. For example, one or more restart points 152, 156, 158, 256, 258, 260 may be predefined, such that when the autonomous construction vehicle 300 is manually driven to the restart point 152, 156, 158, 256, 258, 260, autonomy mode automatically resumes. In some examples, the restart point 152, 156, 158, 256, 258, 260 is the point that the controller 350 will command the machine to and resume work. In some examples, the next point of compaction is the default restart point, but the operator can select a different restart point. The operator can select the default next point of compaction, a different point of compaction in the partially completed lane, or the first point in the next lane of the compaction process. In such cases, in the example of a compactor 300, it may be acceptable to start vibe inside the work area 110.

Optionally, at block 428, after the site plan 100, 200 has been completed, such that the autonomous construction vehicle 300 has reached the stop point of the path 130, 230, the controller 350 may optionally provide a subsequent site plan. For example, in the case of a road worksite, the construction vehicle may move on to the subsequent area to resume working. In at least one example, the controller 350 may use an edge of the previous boundary 102, 202 and the current position of the autonomous construction vehicle 300 to automatically define a new outer boundary of a new portion of a worksite, as well as the new work area. This can help reduce the amount of boundary definition time required by the operator and may allow for more efficient work.

After the outer boundary 102, 202 is defined, in some examples the controller 350 may perform several actions automatically. For example, one or more of: defining the work area 110 at block 414, defining the path orientation 132 at block 406, defining vehicle heading at block 404, defining a start point 146, 148, 246, 247, 248, 250 at block 408, and loading work specifications at block 410 may be performed automatically following definition of the boundary 102, 202. In at least one example, all of these may be performed at the same time without the need for user input. In some examples, one or more of the steps of the method 400 may be applied for a manned operation.

One or more of the steps of the method 400 may be performed onboard the autonomous construction vehicle 300 (e.g. vehicle controller 350, via. manual input, etc.) or offboard the construction vehicle 300 (e.g., at external controller 330, at multiple external sites, etc.) and then downloaded or otherwise received by the autonomous construction vehicle 300.

Site plans 100, 200 are not to scale, but instead illustrate elements for ease of description without relative proportions being accurate. Further, while the illustrated site plans 100, 200 show six path portions, a site plan may include more or less path portions. Further, while the boundary 202 was reduced in site plan 200 to illustrate a minimum required offset distance 224, in the case that the outer boundary was otherwise defined the same as boundary 102, the offset distance 224 may remain equal to the offset distance 124, such that the offset distance for site plan 200 would simply be greater than the minimum required. Alternatively, if advantageous, the boundary 202 could be equal to the boundary 102, and the work area 110 could be increased given the reduced requirement for the offset distance 224 of the front maneuver area 212. Additionally, while the path orientation 132 of site plans 100, 200 is parallel to the longest boundary edge 105, 205, in other examples the path orientation 132 may be determined in any of a variety of manners and may take on any orientation. In at least one example, the path orientation 132 is determined based on the most efficient traversal of the work area. While both site plans 100, 200 illustrate rectangular boundaries 102, 202 and a rectangular work area 110 for ease of illustration and description, one of ordinary skill in the art will recognize how to apply this disclosure to outer boundaries and work areas of any of a variety of shapes. In at least some examples, the work area and boundary of the work site may correspond to a road or other long stretch of a work site, which may include curves or bends.

The expression "configured to", as used herein, may be replaced with "suitable for," "having the capacity to," "designed to," "adapted to," "made to," or "capable of", according to a context. The term "configured to" does not necessarily mean "specifically designed to" in a hardware level. Instead, the expression that an apparatus is "configured to" may mean that the apparatus is "capable of" along with other devices, hardware, firmware, software or parts in a certain context. For example, "a controller configured to perform an operation" may mean a dedicated controller for performing the operation, or a generic-purpose controller (e.g., a CPU or an application processor) capable of performing the operation by executing one or more software programs stored in a memory device.

In the foregoing Detailed Description, various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific examples. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific examples. However, the benefits, advantages, solutions to problems, and any feature(s) that may cause any benefit, advantage, or solution to occur or become more pronounced are not to be construed as a critical, required, or essential feature of any or all the claims. Moreover, the particular examples disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular examples disclosed above may be altered or modified and all such variations are considered within the scope of the disclosed subject matter. Accordingly, the protection sought herein is as set forth in the claims below.

INDUSTRIAL APPLICABILITY

The disclosed systems and methods for construction site planning and controlling an autonomous construction vehicle involve automatically creating a site plan based on an outer boundary of the work site, specifications of the autonomous construction vehicle, specifications of the work to be done, position of the autonomous construction vehicle, orientation of the autonomous construction vehicle, a combination of these, or the like. Such automatic site planning an autonomous control avoids the risk of user error, allows for efficiencies in site plan design and execution, and reduces the amount of user involvement required at a work site. Further, some examples allow for manual override or input to adapt the automatic site plan as needed for specific circumstances, such that the disclosed systems and methods are both efficient and versatile.

What is claimed is:

1. A method for controlling an autonomous construction vehicle, comprising:
   defining a boundary of a construction site;
   identifying a longest edge of the boundary;
   defining path orientation for the autonomous construction vehicle that is parallel to the longest edge of the boundary;
   defining a start point for the autonomous construction vehicle;
   defining a maneuver area for the autonomous construction vehicle based on the boundary and specifications of the autonomous construction vehicle;
   defining a path for the autonomous construction vehicle to navigate the construction site, wherein the path is oriented according to the path orientation, including:
     defining a first path portion starting at the start point and extending in a direction corresponding with the path orientation, and
     defining a maneuver path in the maneuver area;
   automatically creating a site plan indicating the boundary, path, start point, and maneuver area; and
   controlling the operation of the autonomous construction vehicle based on the site plan.

2. The method of claim 1, wherein defining the boundary of the construction site includes mapping the boundary based on movement of the autonomous construction vehicle along the boundary.

3. The method of claim 1, wherein defining the boundary of the construction site includes downloading boundary information.

4. The method of claim 1, wherein defining the path orientation includes:
   defining a vehicle heading of the autonomous construction vehicle; and
   defining the path orientation as parallel to the vehicle heading.

5. The method of claim 1, wherein defining the start point comprises:
   identifying a current position of the autonomous construction vehicle; and
   selecting the start point based on the current position of the autonomous construction vehicle.

6. The method of claim 1, wherein defining the maneuver area comprises:
   defining front, rear, and side offsets within the boundary.

7. The method of claim 1, wherein defining the path further comprises:
   defining a second portion of the path offset from the first portion of the path and extending in the direction corresponding with the path orientation.

8. The method of claim 7, wherein defining the maneuver path comprises:
   defining the maneuver path to navigate the autonomous construction vehicle from the first portion of the path to the second portion of the path.

9. A method for controlling an autonomous construction vehicle, comprising:
   defining a boundary of a construction site;
   identifying a longest edge of the boundary;
   automatically creating a site plan for navigating the autonomous construction vehicle within the boundary, including:
     defining a work area within the boundary,
     defining a maneuver area for the autonomous construction vehicle based on the boundary and specifications of the autonomous construction vehicle, the maneuver area positioned between the work area and the boundary,
     defining a start point for the autonomous construction vehicle, and
     defining a path for the autonomous construction vehicle to navigate the construction site, including:
       defining a first path portion in the work area that is parallel to a longest edge of the boundary, and
       defining a second path portion in the work area, wherein the autonomous construction vehicle is configured to maneuver in the maneuver area to navigate from the first path portion to the second path portion, providing the site plan for review; and
   activating autonomy mode to automatically control operation of the autonomous construction vehicle according to the site plan.

10. The method of claim 9, further comprising:
receiving manual input responsive to providing the site plan for review; and
automatically updating the site plan based on the user input.

11. The method of claim 9, further comprising:
receiving stop instructions; and
automatically deactivating autonomy mode.

12. The method of claim 11, further comprising:
receiving resume instructions:
updating the site plan responsive to the resume instructions; and
activating autonomy mode.

13. The method of claim 12, wherein updating the site plan includes defining a restart point.

14. The method of claim 9, further comprising:
completing the site plan, and
automatically creating a subsequent plan based on the site plan.

15. The method of claim 14, wherein:
the subsequent plan includes a new boundary, a new work area, a new maneuver area, a new path, and a new start point; and
wherein the new start point is based on a stop point of the autonomous construction vehicle after completing the site plan.

16. A system, comprising:
an autonomous construction vehicle; and
a controller, the controller configured to:
define a boundary of a construction site;
define a path orientation for the autonomous construction vehicle such that each path portion within a work area is parallel to a longest edge of the boundary;
define a start point for the autonomous construction vehicle;
define a maneuver area for the autonomous construction vehicle based on the boundary and specifications of the autonomous construction vehicle;
define a path for the autonomous construction vehicle to navigate the construction site, wherein the path includes a first path portion extending from the start point to the maneuver area, wherein the path is oriented according to the path orientation;
automatically create a site plan indicating the boundary, path, start point, and maneuver area; and
automatically control the operation of the autonomous construction vehicle based on the site plan.

17. The system of claim 16, wherein:
the autonomous construction vehicle includes a front and a rear;
a heading of the autonomous construction vehicle is defined by a position of the front relative to a position of the rear; and
the controller is configured to define the path orientation based on the heading of the autonomous construction vehicle.

18. The system of claim 16, wherein the controller is configured to define the start point based on a position of the autonomous construction vehicle.

19. The system of claim 16, wherein the controller is configured to define the maneuver area to include an offset from one side of the boundary large enough to accommodate the autonomous construction vehicle moving from the first portion of the path to a second portion of the path.

* * * * *